a2
US011483500B2

(12) United States Patent
Spyak et al.

(10) Patent No.: US 11,483,500 B2
(45) Date of Patent: Oct. 25, 2022

(54) OPTICAL NON-UNIFORMITY COMPENSATION (NUC) FOR PASSIVE IMAGING SENSORS USING MICRO-ELECTRO-MECHANICAL SYSTEM (MEMS) MICRO-MIRROR ARRAYS (MMAS)

(71) Applicant: Raytheon Company, Waltham, MA (US)

(72) Inventors: Paul R. Spyak, Tucson, AZ (US); Gerald P. Uyeno, Tucson, AZ (US); Benn H. Gleason, Tucson, AZ (US); Sean D. Keller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 30 days.

(21) Appl. No.: 17/211,574

(22) Filed: Mar. 24, 2021

(65) Prior Publication Data

US 2022/0311961 A1 Sep. 29, 2022

(51) Int. Cl.
*H04N 5/365* (2011.01)
*H04N 5/378* (2011.01)

(52) U.S. Cl.
CPC ........... *H04N 5/3651* (2013.01); *H04N 5/378* (2013.01)

(58) Field of Classification Search
CPC .............................. H04N 5/3651; H04N 5/378
See application file for complete search history.

(56) References Cited

U.S. PATENT DOCUMENTS

| 5,404,375 A | 4/1995 | Kroeger et al. |
| 5,854,702 A | 12/1998 | Ishikawa et al. |
| 6,181,450 B1 | 1/2001 | Dishman et al. |

(Continued)

FOREIGN PATENT DOCUMENTS

| DE | 102011104023.8 B4 | 7/2019 |
| EP | 2667142 A1 | 11/2013 |

(Continued)

OTHER PUBLICATIONS

"U.S. Appl. No. 16/871,602, Non Final Office Action dated Nov. 9, 2020", 18 pgs.

(Continued)

*Primary Examiner* — Michael E Teitelbaum
(74) *Attorney, Agent, or Firm* — Schwegman Lundberg & Woessner, P.A.

(57) ABSTRACT

A passive imaging sensor includes a plurality of optical elements in which at least one includes one or more Micro-Electro-Mechanical System (MEMS) Micro-Mirror Arrays (MMAs) having a plurality of independently and continuously controllable mirrors that at least tip and tilt in 2 DOF and may tip, tilt and piston in 3 DOF, In an operational mode, the mirrors are tipped and tilted, and possibly pistoned, such that the optical radiation is focused at the pixelated detector to read out an image of the scene. NUC coefficients such as offset and/or gain are applied to either the output signals of the detector or to the image to form the NUC'd images. In a calibration mode, the mirrors are tipped and tilted and/or pistoned to spatially or temporally blur the image or to re-direct the FOV to one or more on-board calibration sources to generate a uniform image from which to calculate and update the NUC coefficients.

20 Claims, 9 Drawing Sheets

(56) References Cited

U.S. PATENT DOCUMENTS

| | | |
|---|---|---|
| 6,271,953 B1 | 8/2001 | Dishman et al. |
| 6,327,063 B1 | 12/2001 | Rockwell |
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegeriing et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0034814 A1* | 2/2007 | Bailey ............... H04N 9/3194 348/E5.142 |
| 2007/0036480 A1 | 2/2007 | Wu |
| 2007/0103742 A1* | 5/2007 | Ernandes ............. H04N 5/3651 348/E5.081 |
| 2008/0050064 A1 | 2/2008 | Sakai et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0154921 A1 | 5/2019 | Xing et al. |
| 2020/0244359 A1 | 7/2020 | Csonka et al. |
| 2020/0380651 A1* | 12/2020 | Wolfe ..................... G06T 5/40 |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"U.S. Appl. No. 17/007,917, Response filed Dec. 1, 2021 to Non Final Office Action dated Aug. 3, 2021", 16 pgs.

"High Contrast IR Wire Grid Polarizers", Edmund Optics, [Online], Retrieved from the Internet: <URL: https://www.edmundoptics.com/f/high-contrast-ir-wire-grid-poiarizers/14797/>, (Accessed Sep. 4, 2021), 1 pg.

"Mid-Wave Infrared (MWIR) and Long-Wave Infrared (LWIF) Waveplates", Edmund Optics, [Online], Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcie Technologies MEMS Mirrors—Technical Overview", Mlrrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, et al., "Demonstration of large-angle nonmechanical laser beam steering based on LC polymer polarization grating", Proc. of SPIE vol. 8052 80520T, (May 13, 2011), 13 pgs.

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280×720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

U.S. Appl. No. 17/007,917, filed Aug. 31, 2020, Electronically Steered Inter-Satellite Optical Communication System With Micro-Electromechanical (MEM) Micromirror Array (MMA).

"U.S. Appl. No. 17/007,917, Notice of Allowance dated Jan. 10, 2022", 14 pgs.

"U.S. Appl. No. 17/007,917, Supplemental Notice of Allowability dated Apr. 19, 2022", 2 pgs.

\* cited by examiner

OPTICAL NON-UNIFORMITY COMPENSATION (NUC) FOR PASSIVE IMAGING SENSORS USING MICRO-ELECTRO-MECHANICAL SYSTEM (MEMS) MICRO-MIRROR ARRAYS (MMAS)

BACKGROUND OF THE INVENTION

Field of the Invention

This invention relates to Non-Uniformity Compensation (NUC) for Passive Imaging Sensors.

Description of the Related Art

Imaging sensors typically include a pixelated detector that is sensitive to incident photons within a certain spectral band e.g. visible (VIS), Near IR (NIR), Short Wave IR (SWIR), Mid Wave IR (MWIR), Long Wave IR (LWIR), etc., imaging optics having an entrance pupil for receiving light from a scene within a field-of-view (FOV) of the sensor and imaging the FOV onto the pixelated detector; and a read out circuit for reading out an image of the FOV within the spectral band at a frame rate. The detector and read out circuit may be provided in a hybrid device such as a focal plane array (FPA). The scene is composed of multiple point sources of light (collimated due to the distance to the scene) at different angles of incidence. The optics focus light from each point source onto the pixelated detector with the angle of incidence mapping to a spatial offset on the detector to form the image. Passive mode sensors detect emissions or reflected radiation from the scene in the spectral band of the detector. Active mode sensors use a broad beam laser illuminator to illuminate the scene within the FOV of the sensor with laser energy in the spectral band to increase the signal-to-noise ratio (SNR).

Ideally an imaging sensor should respond uniformly across its FOV. That is the sensor response to a point source of illumination anywhere in the FOV should be the same. However, due to manufacturing issues of the pixelated detector and environmental variations and the radiometry of point sources, there are non-uniformities that exist in imaging sensors that must be corrected. Fixed pattern noise describes the non-uniformity in the response of the individual pixels of the detector itself. Notwithstanding the name, the fixed pattern noise can change with time and operating conditions such as temperature.

Non-Uniformity Correction (NUC) may be performed as a calibration step at the time of manufacture and periodically in a laboratory setting. For example, in the thermal infrared, a black body source is used to produce flat field illumination across the sensor's FOV. The sensor's response is measured and used to calculate offset and/or gain coefficients ("NUC coefficients") for each pixel that is inversely proportional to that pixel's response so that when applied to each pixel, the net response of the sensor is uniform over the FOV. This accounts for both fixed pattern noise and other anomalies and design artifacts within the optical system, e.g., contaminants on the optics, defects in optics, IR self-emission variations, etc. These spatial non-uniformities can be pixel-size anomalies, or more smoothly varying anomalies such as gradients across the array. Thereafter, the measured value for each pixel is shifted by the offset coefficient and multiplied by its gain coefficient, a form of "electronic" gain. This may be performed at the detector on the output signals or by downstream processing circuits on the image.

It is often desirable to periodically perform a NUC in an operational setting. To accomplish this the imaging sensor may be provided with a black body source e.g. a small thermal source or a flat plate placed in the FOV. The sensor's response is measured and used to update the offset and gain coefficients for each pixel. This may be accomplished with, for example, a mechanically gimballed mirror that scans the scene and then the black body source. The operational NUC may account for changes in the fixed pattern noise or other anomalies or artifacts. The imaging sensor will lose visibility of the scene during NUC.

Another approach is to utilize a scene-based NUC in which the sequence of images (frames) are filtered and compared to determine and correct the non-uniformity. Filtering may be accomplished with, for example, a focus cell e.g., a plurality of moveable lenses that defocus and blur the image or a filter wheel which includes an optic that blurs the image. Focus cells are also used to account for variations in the optics due to say temperature changes to refocus the image on the imaging sensor. Filter wheels are also used to filter the incident light based on wavelength to only detect certain desired wavebands. Scene-based NUC requires the post-processing of frames for filtering and comparison to previous frames. This process is computationally demanding and uses statistics to determine the non-uniformity of the scene, which could introduce errors in the final image. Scene-based NUC maintains visibility of the scene during NUC.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a passive imaging sensor in which at least one of the optical elements is at least one Micro-Electro-Mechanical System (MEMS) Micro-Mirror Array (MMA) including a plurality of independently and continuously controllable mirrors that at least tip and tilt in 2-degrees of freedom (DOF) and may tip, tilt and piston in 3 DOF. In an operational mode, the mirrors are tipped and tilted such that the optical radiation is focused at the pixelated detector to read out an image of the scene. NUC coefficients such as offset and/or gain are applied to either the output signals of the detector or to the image to form the NUC'd images. In a calibration mode, the mirrors are tipped and tilted and/or pistoned to spatially or temporally blur the image or to re-direct the FOV to one or more on-board calibration sources to generate a uniform image from which to calculate and update the NUC coefficients.

In different embodiments, the MEMS MMA may be nominally flat or have a base curvature to focus the light onto the imaging detector. The base curvature may be provided using tip/tilt/piston to provide a smooth convex/concave surface or to provide a Reflective Fresnel lens, by forming a flexible MEMS MMA on a support structure having the base curvature or mounting a plurality of flat MEMS NaIAs on a faceted support structure whose facets approximate the base curvature. In addition to the calibration functions, tip/tilt/'piston may be used during the operational mode to adjust the base curvature to more precisely focus the optical radiation on the detector to, for example, compensate for aerodynamic or thermal variations, thus providing all functions of a conventional focus cell In an embodiment, the mirrors on the at least one MEMS MMA include optical bandpass coatings that reflect light in at least two different spectral bands. A given MEMS MMA may include mirrors with different optical coatings or different MEMS MMAs may have their mirrors provided with different optical coatings. The processing circuits update the at least one NUC coefficient for each pixel for each of the at least two different spectral bands. In the operational mode the MEMS MMA may be configured to focus optical radiation in one spectral band at a time to generate the image and to apply the at least one NUC coefficient for that spectral band, thus providing all functions of a conventional filter wheel.

In an embodiment, the mirrors may tip, tilt and piston to form, change or translate a curved surface or randomize the curve surface to spatially blur the image. For example, if the MEMS MMA is nominally flat translation of the flat surface or formation of a curved surface will blur the optical image. If the MEMS MMA exhibits a base curvature, translation or modification of the base curvature will blur the optical radiation. Randomization may be done using one or more of tip, tilt or piston or any combination thereof.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a passive imaging sensor in which at least one optical element comprises one or more Micro-Electro-Mechanical System (MEMS) Micro-Mirror Arrays (MMAs) including a plurality of independently and continuously controllable mirrors that at least tip and tilt in 2 DOF and may tip, tilt and piston in 3 DOF. In an operational mode, the mirrors are tipped and tilted, and possibly pistoned, such that the optical radiation is focused at the pixelated detector to read out an image of the scene. NUC coefficients such as offset and/or gain are applied to either the output signals of the detector or to the image to form the NUC'd images. In a calibration mode; the mirrors are tipped and tilted and/or pistoned to spatially or temporally blur the image or to re-direct the FOV to one or more on-board calibration sources to generate a uniform image from which to calculate and update the NUC coefficients.

Figure 1:
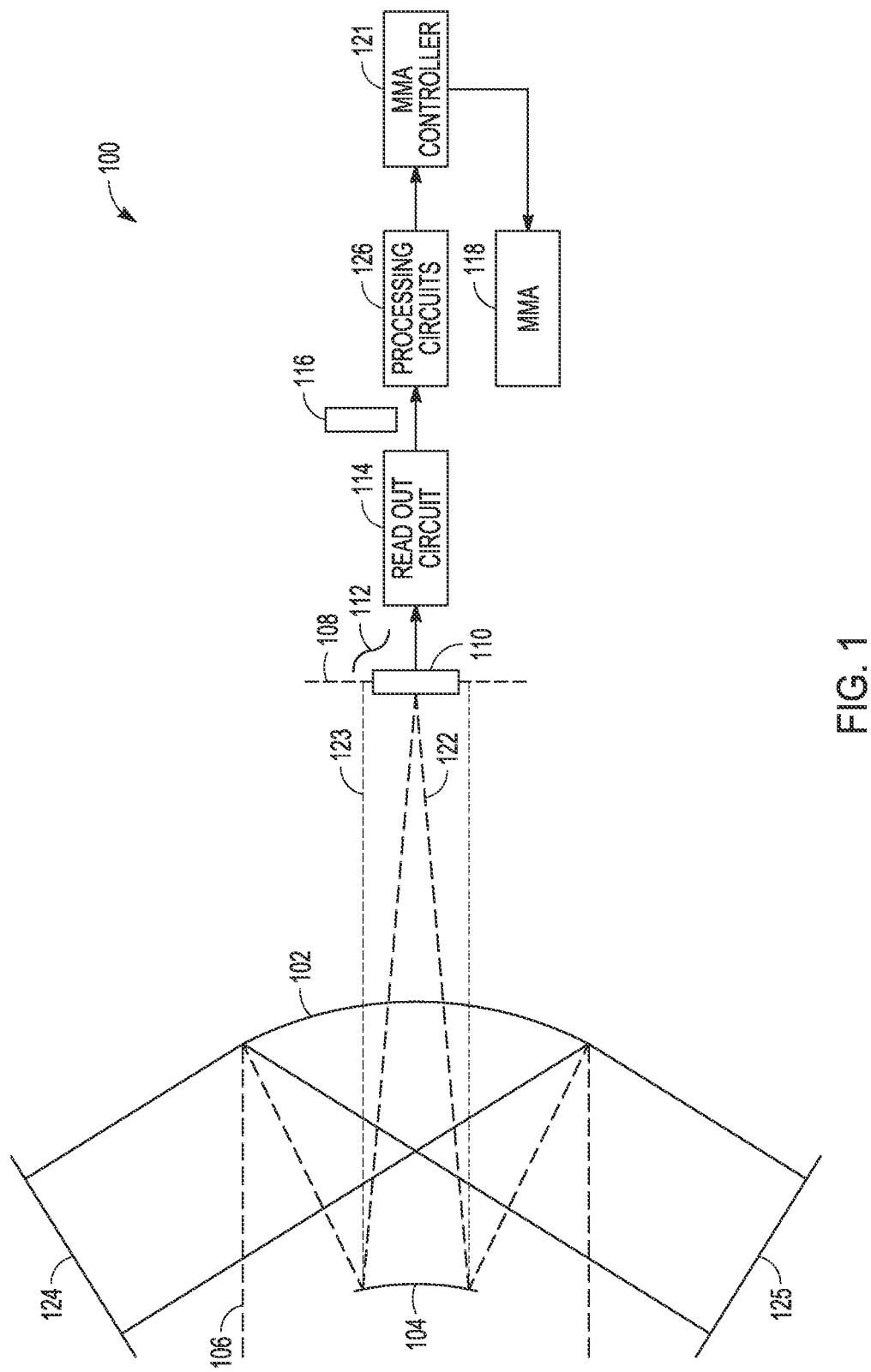
FIG. 1 is a diagram of an embodiment of a passive imaging sensor in which a MEMS MMA is configured to facilitate NUC calibration.
Figure 2A:
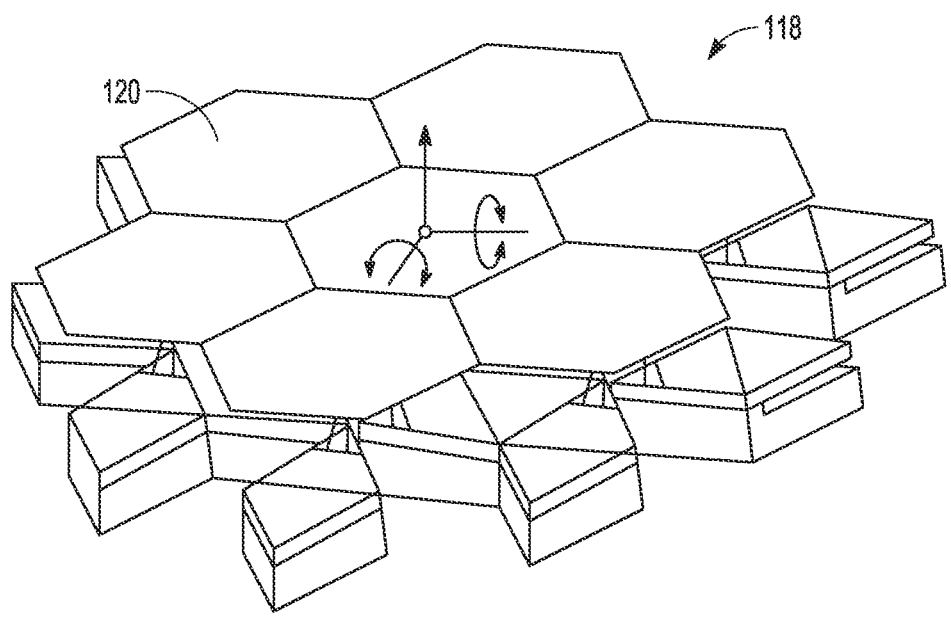
FIGS. 2A-2B are illustrations of a known embodiment of a Tip/Tilt/Piston ("TTP") MEMS MMA and a single mirror actuated to tip, tilt and piston.
Figure 2B:
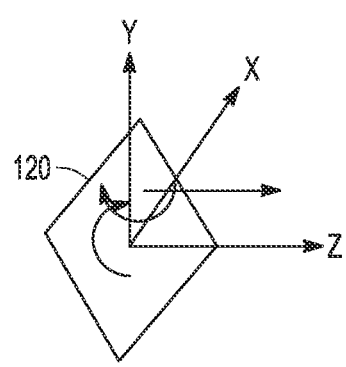

Referring now to FIGS. 1 and 2A-2B, an embodiment of a passive imaging sensor 100 includes a plurality of optical elements, here a primary mirror 102 and a secondary mirror 104 configured in a conventional Cassegrain telescope configuration to collect optical radiation 106 from a scene within a field-of-view (FOV) and focus the optical radiation at an image plane 108. There are many other optical configurations that collect and focus optical radiation to an image plane, this is merely one example. A pixelated detector 110 is positioned at the image and each pixel is configured to generate an output signal 112 responsive to incident optical radiation. Each pixel is characterized by at least one NUC coefficient, typically an offset and/or a gain coefficient. A read out circuit 114 such as a read out integrated circuit (ROIC) is configured to read out the output signals 112 from the pixelated detector at a frame time to form an image or sequence of images 116. Often the pixelated detector and ROTC are combined in a single device such as a focal plane array (FPA).

In this example, the primary and/or secondary mirror comprise at least one MEMS MMA 118 including a plurality of independently and continuously controllable mirrors 120 that at least tip and tilt in at least two degrees-of-freedom (DOF) and may tip/tilt/piston in 3 DOF. Each mirror is capable of at least "Tip" (rotation about an X-axis), "Tilt" (rotation about a Y-axis and, if applicable, "Piston" (translation along a Z-axis, perpendicular to the XY plane) where the X, Y and Z are orthogonal axes in a three-dimensional space. The MEMS MMA 118 is suitably placed near the entrance pupil of the optical system so that the structure of the MMA is not imaged onto the detector.

A MEMS MMA controller 121 is configured to generate command signals for the MEMS MMA 118 which in an operational mode, tip/tilt or tip/tilt/piston the mirrors such that the optical radiation collected from the scene is focused at the pixelated detector to generate the image of the scene (focused image 122), and in a calibration mode, tip/tilt or tip/tilt/piston the mirrors to spatially or temporally blur the image (blurred spot 123) or to re-direct the FOV to one or more on-board calibration sources 124 and 125 that produce uniform illumination at two different light levels to generate the image. The optical elements in the system may be manipulated to produce the blurred image at two different light levels in order to calculate the NUC coefficients.

Processing circuits 126 are configured to process the one or more images 116 received in calibration mode to update the at least one NUC coefficient e.g., offset and/or gain, for each pixel in the pixelated detector 110 and to apply the at least one NUC coefficient for each pixel to the output signals or images received in the operational mode to form NUC'd images. In other words, the offset and gain may be applied in the read out circuit 114 or to the read out images 116.

In certain configurations, the MEMS MMA only requires tip and tilt capability to perform both the operational and calibration modes. The MEMS MMA may provide either a nominally flat mirror surface or one having a base curvature to focus optical radiation onto the pixelated detector. Piston is not required to form the flat mirror surface. A base curvature may be formed with a flexible MEMS MMA on a support structure having the base curvature or by mounting a plurality of flat MEMS MMAs on a faceted support structure whose facets approximate the base curvature. In calibration mode, tip/tilt can be used to randomize the surface to spatially blur the image or to steer the FOV to either temporally blur the image or re-direct the FOV to one or more calibration surfaces.

However, if piston capability is supported by the MEMS MMA it can be used to provide the base curvature for operations and to support calibration. Piston can be used to provide a smooth curvature (convex/concave) or to define a reflective Fresnel Lens that define the base curvature. Piston can be used to translate or modify the base curvature to blur the image. Although not strictly required, piston can be used during steering of the FOV to reduce other aberrations. During operations, piston can also be used for other beam shaping functions such as to adjust the size, divergence or intensity profile of the beam, produce deviations in the wavefront of the beam to compensate for atmospheric distortions or path length differences, and adjust the focus to account for aerodynamic, thermal or other variations.

In an embodiment, the MEMS MMA is preferably capable of tipping and tilting over range of at least −15°× ±15° to steer over a range of +/−30°×30° and pistoning (translating) over a range of at least +/−15 microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

Figure 3A:
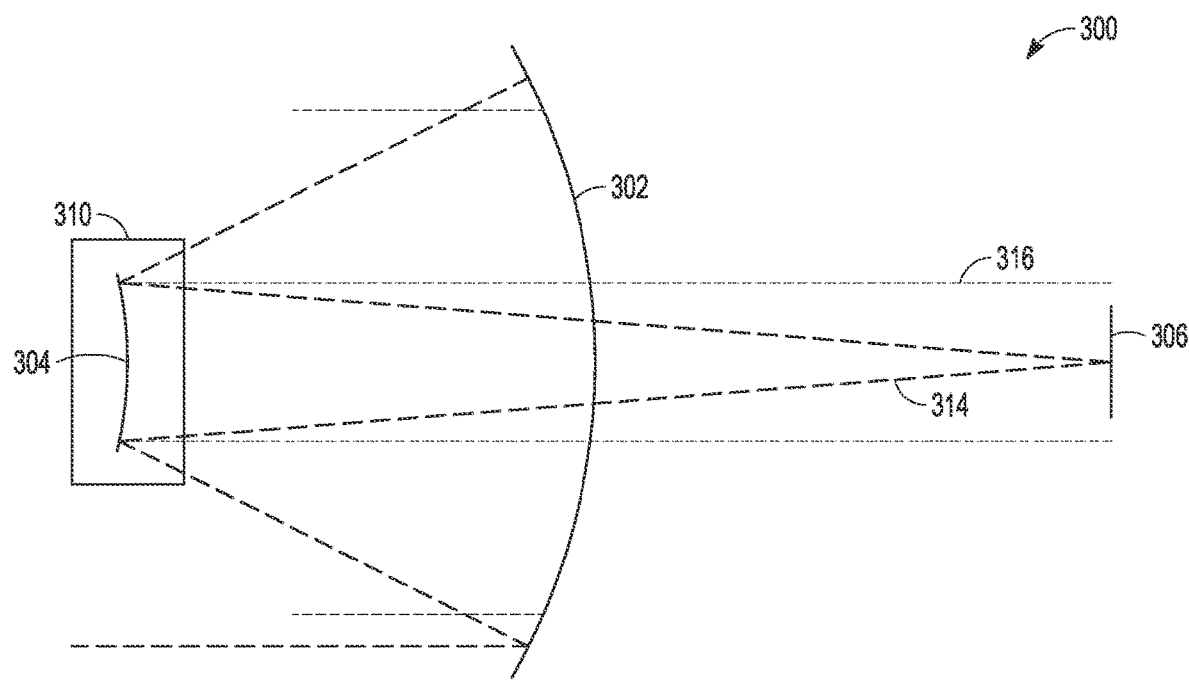
FIGS. 3A-3B and 4A-4D are illustrations of different configurations of the MEMS MMA as the secondary and primary optical elements, respectively, to spatially blur the image to provide a uniform image for NUC calibration.
Figure 3B:
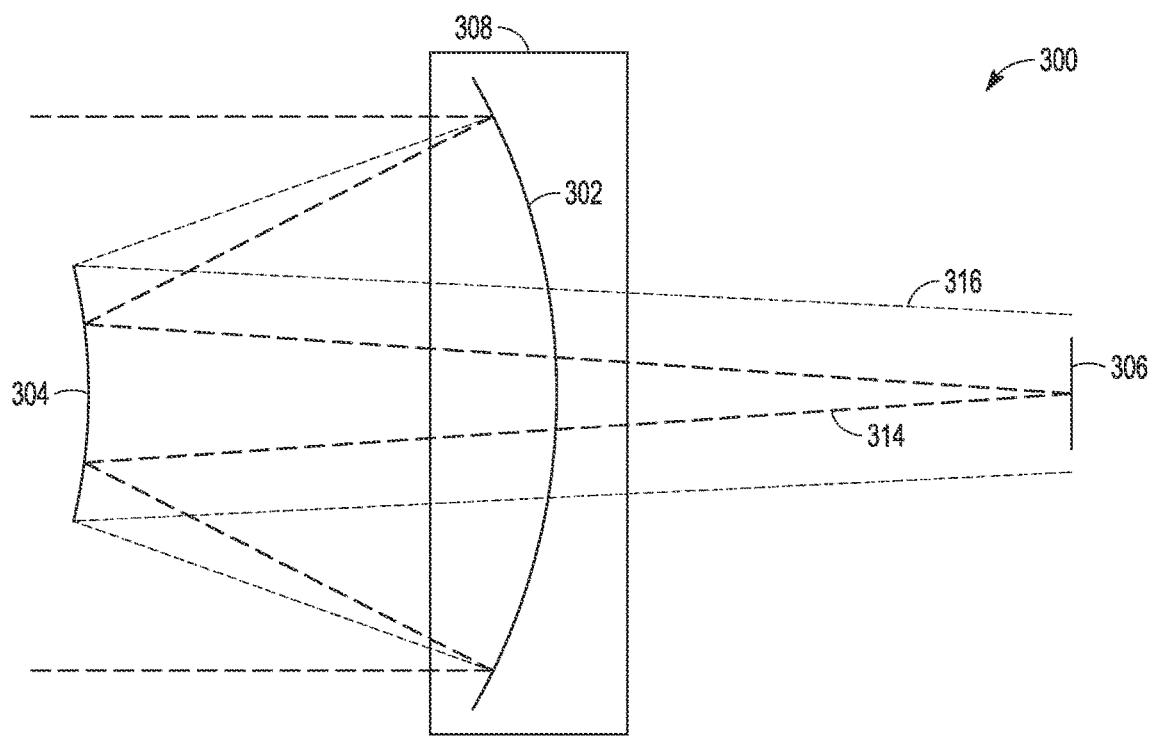

One such MEMS MMA as illustrated in FIGS. 2A-2B is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

Referring now to FIGS. 3A-3B and 4A-4D, an embodiment of a passive imaging sensor 300 includes a plurality of optical elements, here a primary mirror 302 and a secondary mirror 304 configured in a conventional Cassegrain telescope configuration to collect optical radiation from a scene within a field-of-view (FOV) and, in the operation mode, focus the optical radiation at a pixelated detector 306 and, in the calibration mode, spatially defocus/blur the optical radiation at the pixelated detector to provide an image that has roughly uniform light levels through out (a "uniform image"). As shown, either (or both) of the primary mirror 302 and secondary mirror 304 may be formed by one or more MEMS 308 and 310, respectively. Without loss of generality, the primary mirror 302 or secondary mirror 304 formed by the one or more MEMS MMAs nominally exhibits a base curvature 312 configured (together with the rest of the optical system) to focus optical radiation to form a focused image 314 at pixelated detector 306. As shown, the base curvature 312 is in the form of a typical convex mirror.

As will be described in more detail later, the one or more MEMS MMAs may be configured in various ways to provide the base curvature 312. The mirrors may be tipped/tilted/pistoned to provide the base curvature provided there is sufficient dynamic range in piston to form the requisite curvature. If not, the one or more MEMS MMAs may be configured to implement a reflective Fresnel lens that provides an effective base curvature. With the same amount of piston dynamic range, the reflective Fresnel lens can support a larger range of focal lengths but exhibits diffraction off of the concentric ring structure. Alternately, a flexible MEMS MMA may be formed on a support structure having the base curvature or a plurality of flat MEMS MMAs on a faceted support structure whose facets approximate the base curvature. These approaches reserve the available dynamic range in piston to modify the base curvature for purposes of calibration or other operational functions.

Figure 4D:
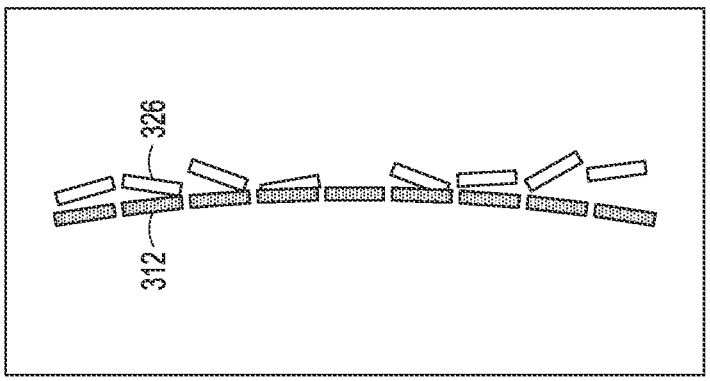
Figure 4C:
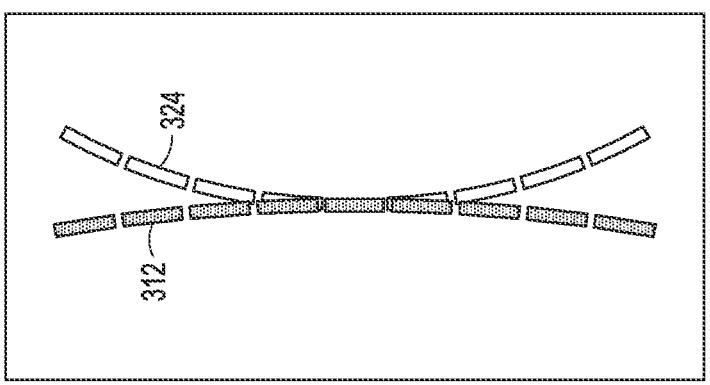
Figure 4B:
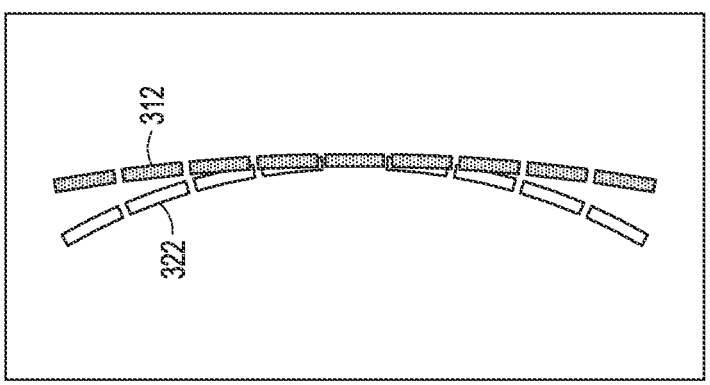
Figure 4A:
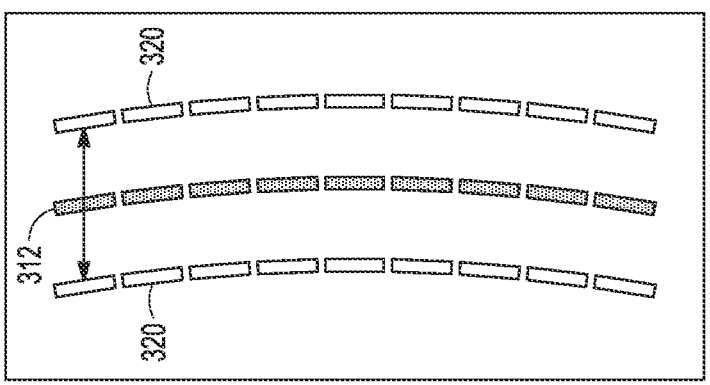

In this embodiment, the one or more MEMS MMAs are responsive to command signals to tip/tilt/piston the mirrors to spatially blur the image to form a blurred spot 316 at pixelated detector 306. As shown in FIG. 4A, the mirrors are pistoned to translate the base curvature 312 to a curvature 320 to defocus/blur the image to provide the uniform image. As shown in FIG. 4B, the mirrors are tipped/tilted/pistoned to add curvature to form a curvature 322 to defocus/blur the image. As shown in FIG. 4C, the mirrors are tipped/tilted/pistoned to add curvature to form a curvature 324 to image before the pixelated detector to defocus/blur the image. As shown in FIG. 4D, the mirrors are tippled/tilted and possibly pistoned to form random orientations 326 on the base curvature.

In practice, the base curvature is selected to focus light at the pixelated detector during the operational mode under designed for or nominal operating conditions. Once fielded, the image plane may move off of the pixelated detector due to aerodynamic or thermal among other effects. The MEMS MMA may be used to tip/tilt/piston to adjust the base curvature to move the image plane back to the pixelated detector to refocus the imaging system. This capability may in some applications eliminate the need for a focus cell.

Figure 5A:
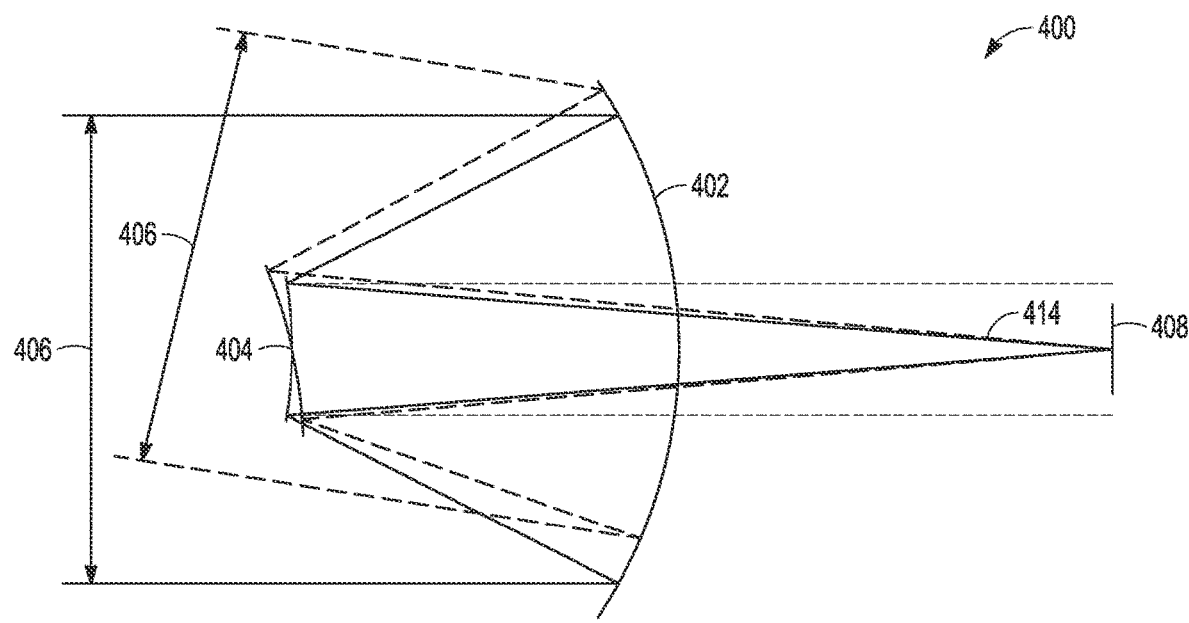
FIGS. 5A-5B and 6 are illustrations of different configurations of the MEMS MMA as the secondary and primary optical elements, respectively, to temporally average or blur a sequence of images to provide a uniform image for NUC calibration.
Figure 5B:
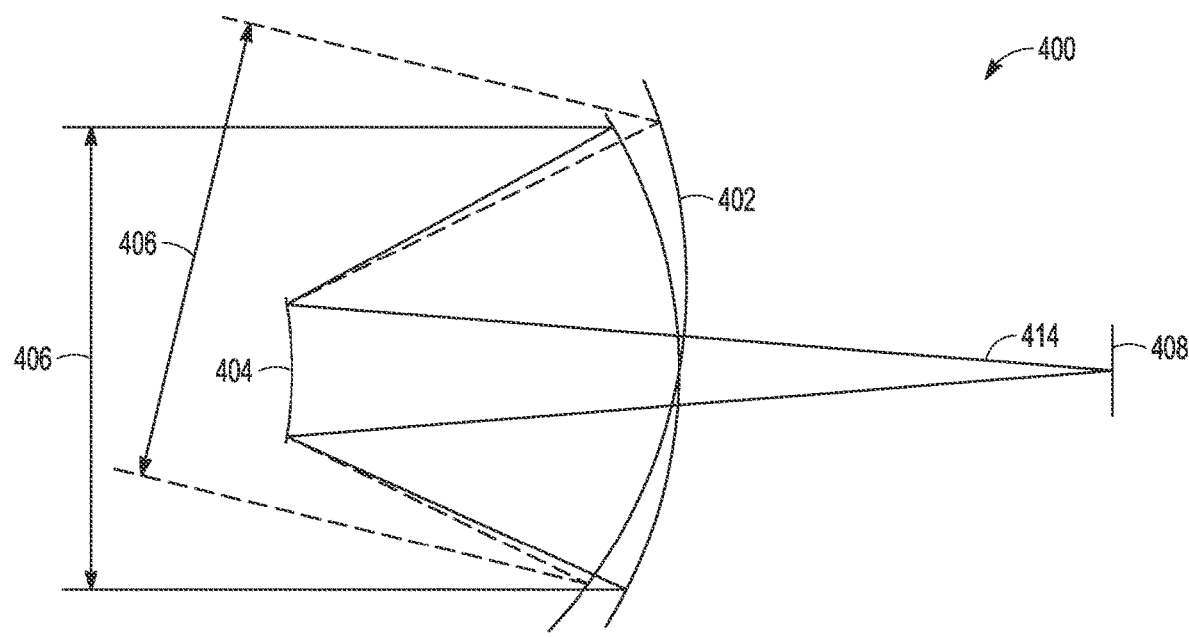
Figure 6:
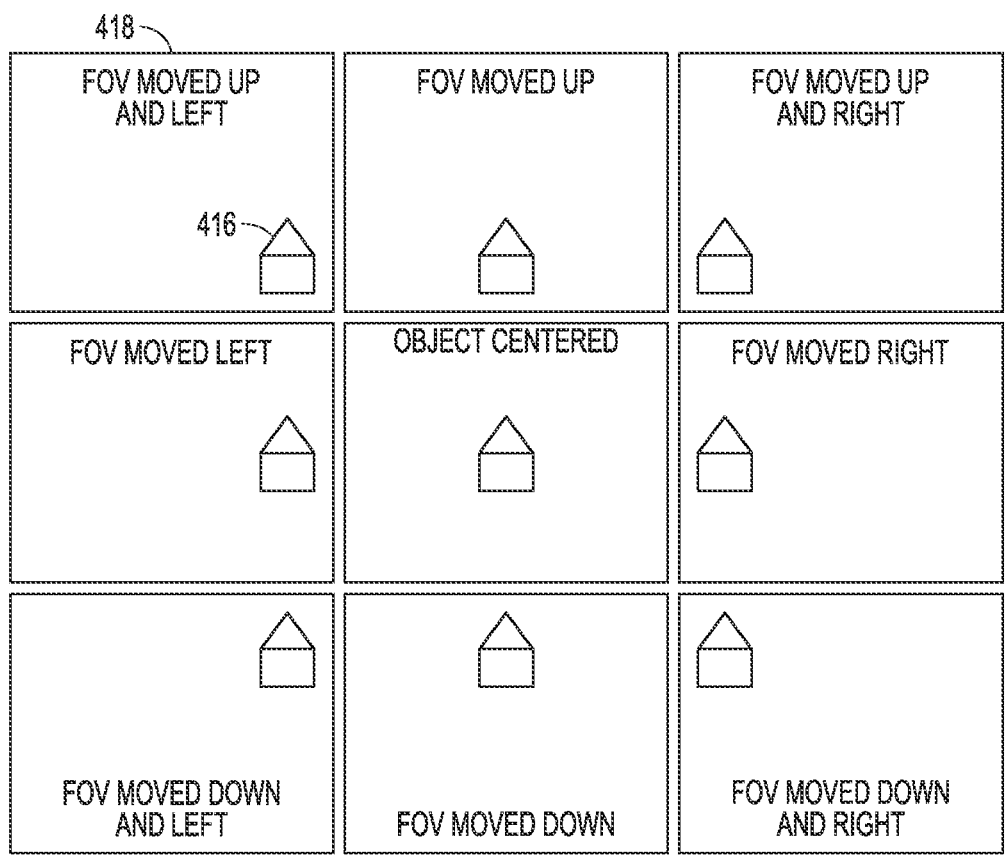

Referring now to FIGS. 5A-5B and 6, an embodiment of a passive imaging sensor 400 includes a plurality of optical elements, here a primary mirror 402 and a secondary mirror 404 configured in a conventional Cassegrain telescope configuration to collect optical radiation from a scene within a field-of-view (FOV) 406 and direct the optical radiation to a pixelated detector 408. As shown, either (or both) of the primary mirror 402 and secondary mirror 404 may be formed by one or more MEMS MMAs. The one or more MEMS MMAs are responsive to command signals to control the mirrors to, in the operation mode, focus optical radiation to form a focused image 414 including structure 416 at pixelated detector 408. In the calibration mode, the one or more MEMS MMAs are responsive to command signals to at least tip and tilt the mirrors to steer the FOV about the scene to present different focused images 418 to the pixelated detector over time. These images are temporally averaged to produce the uniform image. The MEMS MMAs may either steer the FOV rapidly to perform this integration within a singe frame (integration time) so that the image read out at the frame rate is the uniform image or steer the FOV slowly so that each read out image is a focused image for a different FOV with the series of images being integrated by the processing electronics to form the uniform image. Although not required for steering, piston may be used to reduce aberrations or other distortions caused by the optical system or steering.

Figure 7A:
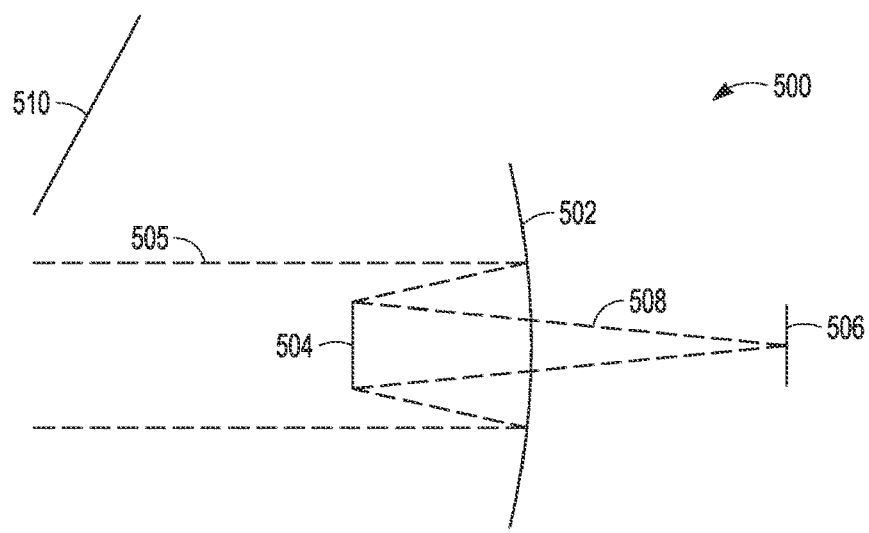
FIGS. 7A-7C are illustrations of different configurations of the MEMS MMA as the secondary and primary optical elements, respectively, to re-direct the FOV to an on-board calibration source to provide a uniform image for NUC calibration.
Figure 7B:
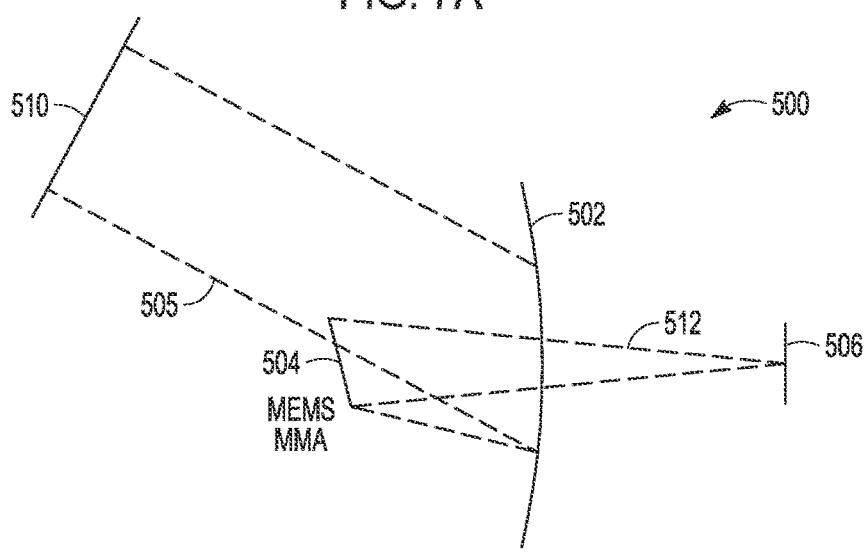
Figure 7C:
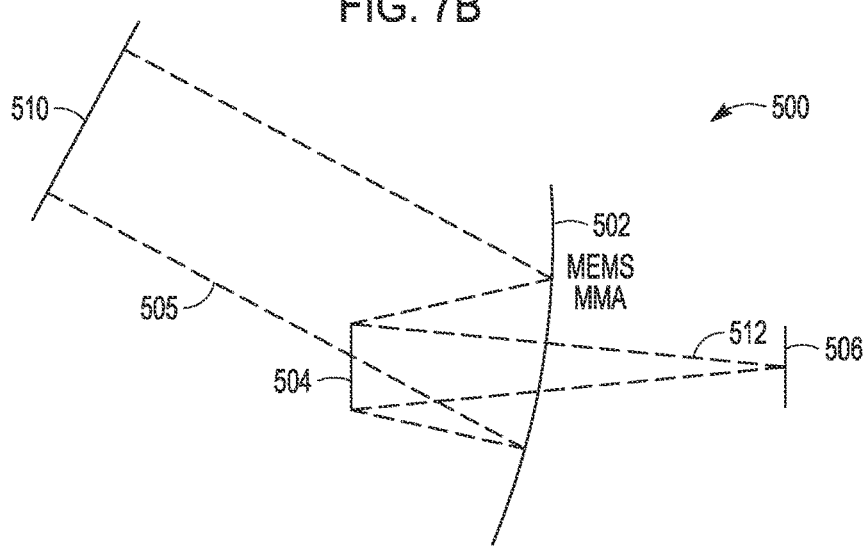

Referring now to FIGS. 7A-7C, an embodiment of a passive imaging sensor 500 includes a plurality of optical elements, here a primary mirror 502 and a secondary mirror 504 configured in a conventional Cassegrain telescope configuration to collect optical radiation from a scene within a field-of-view (FOV) 505 and direct the optical radiation to a pixelated detector 506. As shown, either both) of the primary mirror 502 and secondary mirror 504 may be formed by one or more MEMS MMAs. In either configuration, in the operational mode, the one or more MEMS MMAs are responsive to command signals to control the mirrors to focus optical radiation from the scene to form a focused image 508 at pixelated detector 506. In the calibration mode, the one or more MEMS MMAs are responsive to command signals to at least tip and tilt the mirrors to re-direct the FOV 505 to an on-board calibration source 510, which emits a light field to produce a uniform image 512 at the pixelated detector. Although not shown, the MEMS MMA would typically re-direct the FOV 505 to two different calibration sources that emit uniform images at different light levels in order to perform the calibration. As shown in FIG. 7B, secondary mirror 502 is configured using the one or more MEMS MMAs to re-direct the FOV. As shown in FIG. 7C, primary mirror 504 is configured using the one or more MEMS MMAs to re-direct the FOV. Although not required for steering, piston may be used to reduce aberrations or other distortions caused by the optical system or steering.

Figure 8A:
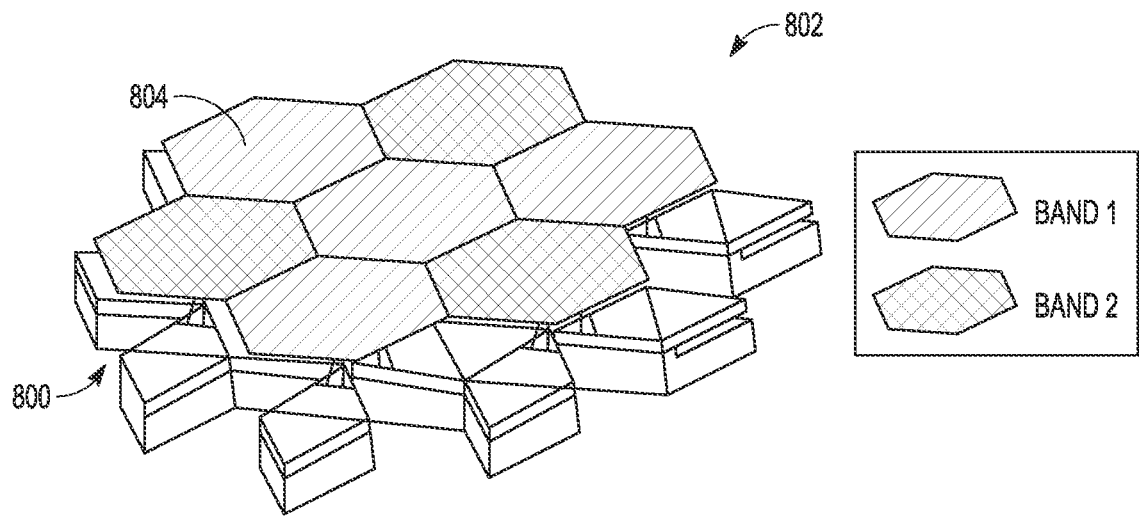
FIGS. 8A-8B are illustrations of a configuration of the MEMS MMA including reflective coatings at different wavelengths to provide multi-spectral imaging.
Figure 8B:
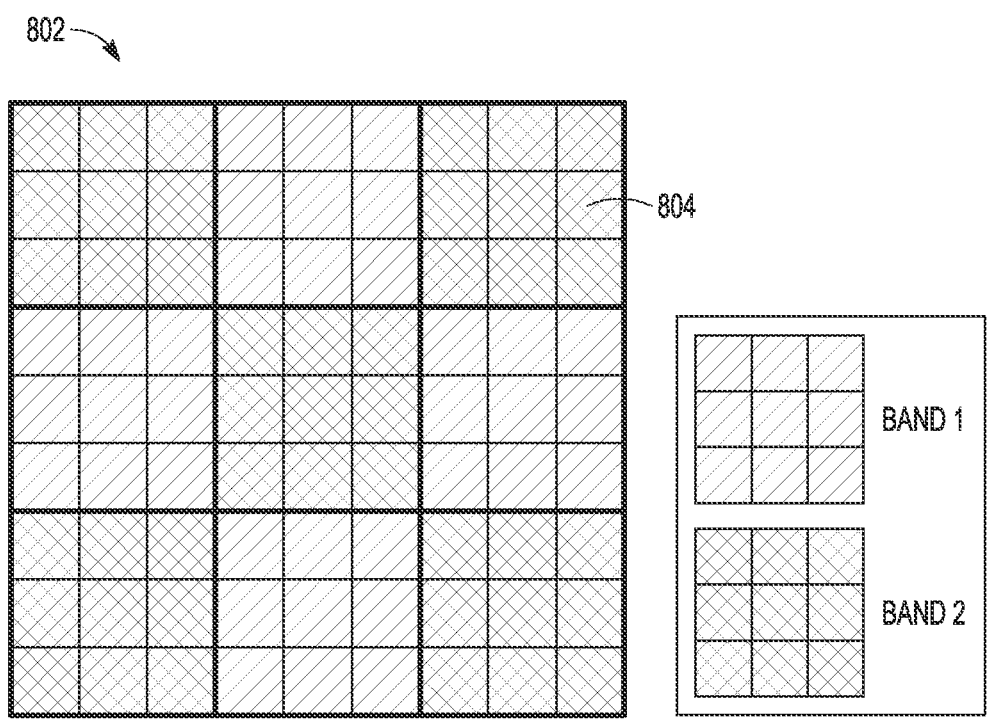

Referring now to FIGS. 8A and 8B, the use of one or more MEMS MMA provides the capability for a multi-spectral system and for calibration of NUC coefficients for each of the spectral bands. The mirrors 800 on the at least one MEMS MMA 802 include optical bandpass coatings 804 that reflect optical radiation in at least two different spectral bands. In any of the above calibration configurations, the one or more MEMS MMAs are responsive to command signals to tip/tilt/piston the mirrors for a specific spectral band to collect and process light to compute the NUC coefficients for the given band and to apply the NUC coefficients during operations to provide a NUC'd image in the spectral band. As shown in FIG. 8A, the optical bandpass coatings 804 are interspersed among the mirrors 800 on a given MEMS MMA 802. As shown in FIG. 8B, each of a plurality of MEMS MMAs 802 are provided with a particular optical bandpass coating 804 e.g. in a configuration of nine tiled MMAs four are provided with a coating in a first band and five are provided with a coating in a second band.

Figure 9:
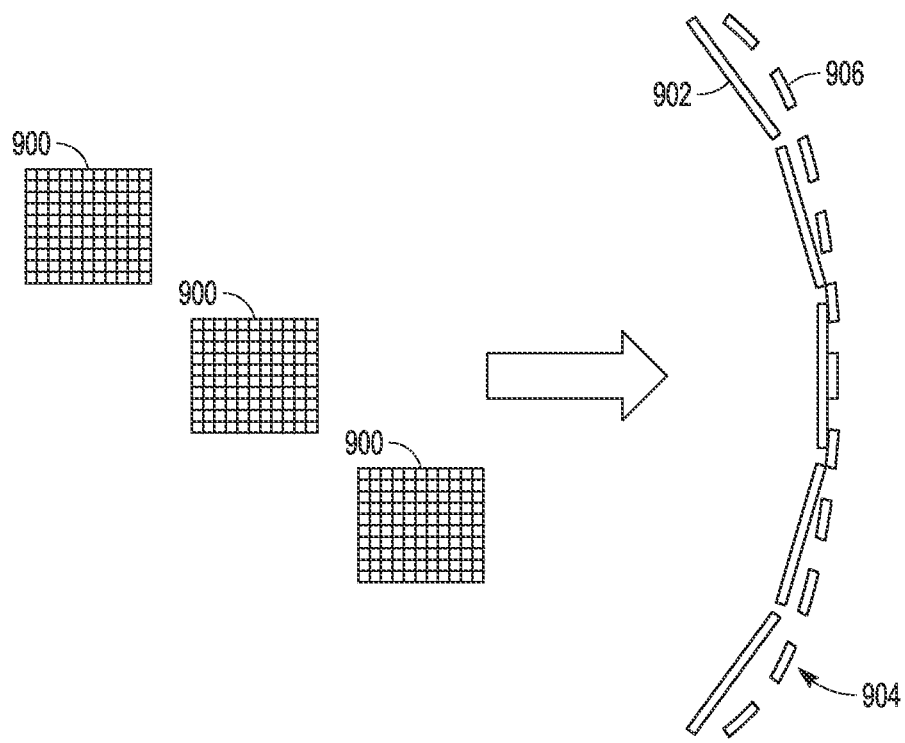
FIG. 9 is an illustration of an embodiment in which a plurality of planar MEMS MMAs are attached to different facets of a support structure configured to approximate a base curvature of a primary or secondary mirror.
Figure 10:
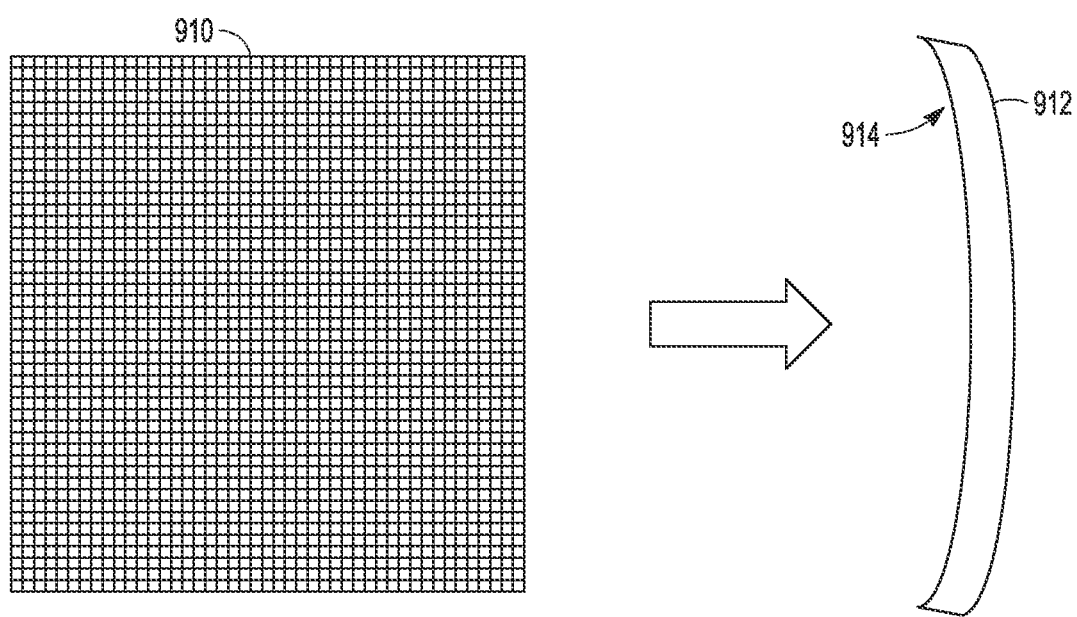
FIG. 10 is an illustration of an embodiment in which a conformal MEMS MMA is attached to a support structure configured with a base curvature of a primary or secondary mirror.

Referring now to FIGS. 9 and 10, as previously described the base curvature of the optical element formed by the one or more MEMS MMAs may be provided without requiring or using a piston capability to translate the individual mirrors. This is useful if either the MEMS MMA does not support piston capability or to preserve the dynamic range of piston action for performing the calibration or other operational functions. As shown in FIG. 9, a plurality of flat MEMS MMAs 900 are mounted onto flat facets 902 of a support structure 904. The facets are arranged such that in combination the facets, hence the MEMS MMA approximate in a piecewise linear fashion a base curvature 906. In certain applications this approximation may be sufficient to meet system specifications. Alternatively, if the MEMS MMA does support piston, the mirrors may be tipped/tilted/piston to effectively smooth out the piecewise linear approximation to the base curvature, requiring less piston to do this than to provide the entire base curvature. As shown in FIG. 10, one or more flexible or curved MEMS MMAs 910 are mounted on a support 912 that provides the base curvature 914.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A passive imaging sensor, comprising:
   a plurality of optical elements configured to collect optical radiation from a scene within a field-of-view (FOV) and focus the optical radiation at an image plane, at least one said optical element comprising a Micro-Electro-Mechanical System (MEMS) Micro-Mirror Array (MMA) including a plurality of independently and continuously controllable mirrors that at least tip and tilt in at least two degrees-of-freedom (DOF);
   a pixelated detector positioned at the image plane, each pixel configured to generate an output signal responsive to incident optical radiation and each pixel characterized by at least one Non-Uniformity Compensation (NUC) coefficient;
   a read out circuit configured to read out the output signals from the pixelated detector at a frame time to form an image;
   a MEMS MMA controller configured to generate command signals for the MEMS MMA which
      in an operational mode, at least tip and tilt the mirrors to focus the optical radiation collected from the scene at the pixelated detector to generate the image of the scene, and
      in a calibration mode, at least tip and tilt the mirrors to spatially or temporally blur the image or to re-direct the FOV to one or more on-board calibration sources to generate the image; and
   one or more processing circuits configured to process the one or more images received in calibration mode to update the at least one NUC coefficient for each pixel in the pixelated detector and to apply the at least one NUC coefficient for each pixel to the output signals or images received in operational mode to form NUC'd images.

2. The passive imaging sensor of claim 1, wherein in calibration mode the mirrors at least tip and tilt to spatially blur the image.

3. The passive imaging sensor of claim 2, wherein the mirrors tip, tilt and piston in 3 DOF, wherein in calibration mode the mirrors tip, tilt and piston to either form, change or translate a curved surface or randomize the curved surface to spatially blur the image.

4. The passive imaging sensor of claim 1, wherein in calibration mode the mirrors at least tip and tilt to steer the FOV over the scene to temporally blur the image within one or more frames.

5. The passive imaging sensor of claim 1, wherein in calibration mode the mirrors at least tip and tilt to re-direct the FOV to the one or more on-board calibration sources.

6. The passive imaging sensor of claim 1, wherein the at least one MEMS MMA has or is formed on a curved support to provide a base curvature to focus optical radiation on the pixelated detector.

7. The passive imaging sensor of claim 1, further comprising a support structure having a plurality of flat facets that in combination approximate a base curvature to focus optical radiation on the pixelated detector, wherein a plurality of flat MEMS MMAs are mounted on the facets.

8. The passive imaging sensor of claim 1, wherein the mirrors on the at least one MEMS MMA include optical bandpass coatings that reflect optical radiation in at least two different spectral bands, wherein the processing circuits update the at least one NUC coefficient for each pixel for each of the at least, two different spectral bands.

9. The passive imaging sensor of claim 8, wherein in the operational mode the MEMS MMA is configured to focus optical radiation in one spectral band at a time to generate the image and to apply the at least one NUC coefficient for that spectral band.

10. The passive imaging sensor of claim 1, wherein in the operational mode the mirrors form a base curvature to nominally focus the optical radiation at the pixelated detector, where in the operational mode the MEMS MMA tips, tilts and pistons the mirrors to modify the base curvature to precisely focus the optical radiation at the pixelated detector.

11. The passive imaging sensor of claim 1, wherein the at least one NUC coefficient comprises an offset or gain coefficient.

12. A passive imaging sensor, comprising:
a plurality of optical elements configured to collect optical radiation from a scene within a field-of-view (FOV) and focus the optical at an image plane, at least one said optical element comprising a Micro-Electro-Mechanical System (MEMS) Micro-Mirror Array (MMA) including a plurality of independently and continuously controllable mirrors that tip, tilt and piston in three degrees-of-freedom (DOF);
a pixelated detector positioned at the image plane, each pixel configured to generate an output signal responsive to incident optical radiation and each pixel characterized by at least one Non-Uniformity Compensation (NUC) coefficient;
a read out circuit configured to read out the output signals from the pixelated detector at a frame time to form an image;
a MEMS MMA controller configured to generate command signals for the MEMS MMA which
in an operational mode, the mirrors form a base curvature to focus the optical radiation collected from the scene at the pixelated detector to generate the image of the scene, and
in a calibration mode, tip, tilt and piston the mirrors to spatially or temporally blur the image or to re-direct the FOV to one or more on-board calibration sources to generate the image; and
one or more processing circuits configured to process the one or more images received in calibration mode to update the at least one NUC coefficient for each pixel in the pixelated detector and to apply the at least one NUC coefficient for each pixel to the output signals or images received in operational mode to form NUC'd images.

13. The passive imaging sensor of claim 12, wherein the one or more MEMS MMAs are placed on a support structure to form the base curvature.

14. The passive imaging sensor of claim 12, wherein the mirrors one or more MEMS MMAs are tipped, tilted and pistoned to form the base curvature.

15. The passive imaging sensor of claim 12, wherein in calibration mode the mirrors tip, tilt and piston to either translate the base curvature that otherwise focuses the optical radiation onto the pixelated detector, change the base curvature or randomize the base curvature to spatially blur the image.

16. The passive imaging sensor of claim 12, wherein in calibration mode the mirrors at least tip, tilt and piston to turn the base curvature to steer the FOV over the scene to temporally blur the image within one or more frames.

17. The passive imaging sensor of claim 12, wherein in calibration mode the mirrors tip, tilt and piston to turn the base curvature to re-direct the FOV to the one or more on-board calibration sources.

18. The passive imaging sensor of claim 12, wherein the mirrors on the at least one MEMS MMA include optical bandpass coatings that reflect optical radiation in at least two different spectral bands, wherein the processing circuits update the at least one NUC coefficient for each pixel for each of the at least two different spectral bands, wherein in the operational mode the MEMS MMA is configured to focus optical radiation in one spectral band at a time to generate the image and to apply the at least one NUC coefficient for that spectral band.

19. The passive imaging sensor of claim 12, wherein in the operational mode the base curvature nominally focuses the optical radiation at the pixelated detector, where in the operational mode the MEMS MMA tips, tilts and pistons the mirrors to modify the base curvature to precisely focus the optical radiation at the pixelated detector.

20. The passive imaging sensor of claim 12, wherein the at least one NUC coefficient comprises an offset or gain coefficient.

* * * * *

UNITED STATES PATENT AND TRADEMARK OFFICE
CERTIFICATE OF CORRECTION

PATENT NO. : 11,483,500 B2  
APPLICATION NO. : 17/211574  
DATED : October 25, 2022  
INVENTOR(S) : Spyak et al.

Page 1 of 1

It is certified that error appears in the above-identified patent and that said Letters Patent is hereby corrected as shown below:

On the Title Page

Item (57), in "Abstract", in Column 2, Line 6, delete "DOF," and insert --DOF.-- therefor In the Specification In Column 1, Line 22, delete "detector;" and insert --detector,-- therefor In Column 2, Line 63, delete "Na1As" and insert --MMA-- therefor In Column 2, Line 65, delete "tip/tilt/'piston" and insert --tip/tilt/piston-- therefor In Column 4, Line 11, delete "mode;" and insert --mode,-- therefor In Column 4, Line 33, delete "ROTC" and insert --ROIC-- therefor In Column 5, Line 32, delete "±15°" and insert --+15°-- therefor In Column 5, Line 35, delete "KHz" and insert --kHz-- therefor In Column 7, Line 10, before "both)", insert --(or--

In Column 7, Line 25, delete "502" and insert --504-- therefor

In Column 7, Line 27, delete "504" and insert --502-- therefor

In the Claims

In Column 9, Line 9, in Claim 8, delete "least," and insert --least-- therefor

Signed and Sealed this  
Twelfth Day of September, 2023

Katherine Kelly Vidal  
*Director of the United States Patent and Trademark Office*